United States Patent [19]

Reittinger et al.

[11] Patent Number: 5,677,631
[45] Date of Patent: Oct. 14, 1997

[54] COAXIAL TWO PORT WAVEGUIDE FLOWLINE SENSOR

[75] Inventors: Peter W. Reittinger, Katy; James T. Cernosek, Missouri City, both of Tex.

[73] Assignee: Western Atlas International, Inc., Houston, Tex.

[21] Appl. No.: 660,481

[22] Filed: Jun. 7, 1996

[51] Int. Cl.⁶ .................. G01V 3/30; G01N 22/00; E21B 49/00
[52] U.S. Cl. .................. 324/324; 324/639; 73/152.18
[58] Field of Search .................. 324/324, 204, 324/637, 638, 639, 640, 641; 73/152.01, 152.18, 152.19; 166/250.01; 175/40, 48, 59

[56] References Cited

U.S. PATENT DOCUMENTS

5,341,100   8/1994   Taylor .................. 324/324

Primary Examiner—Walter E. Snow
Attorney, Agent, or Firm—Gerald E. Lester

[57] ABSTRACT

A two-port, coaxial, waveguide flowline sensor for transmitting TEM mode electromagnetic radio frequency signals through borehole fluids flowing through a longitudinal flowline cavity of the waveguide. The waveguide flowline sensor responds to changes in the conductivity, dielectric constant, and state of the fluid at high borehole temperatures and pressures. The sensitivity of the sensor is enhanced by impedance mismatches between two feedthrough waveguides comprising the ports of the sensor, and a flowline cavity waveguide.

11 Claims, 6 Drawing Sheets

COAXIAL TWO PORT WAVEGUIDE FLOWLINE SENSOR

BACKGROUND OF THE INVENTION

1. Field of the Invention

The invention relates generally to sub-surface formation fluid testers for measuring the electrical properties of a formation fluid, and more particularly to a coaxial waveguide flowline sensor used in the tester for sensing changes in the conductivity, dielectric constant, and state of the formation fluid flowing through the sensor.

2. Description of the Related Art

In the exploration of subsurface formations for hydrocarbons, a subsurface formation tester is lowered into a borehole to collect formation fluids, and to measure the physical properties of the fluids and associated formations. From the fluid properties, it may be determined whether the hydrocarbon content and producibility are sufficient to justify the completion of an oil well.

In the past, the formation fluids that were collected by a tool in a borehole were measured at the surface under temperatures and pressures which were different from that of the subsurface formation being tested. Further, the number of fluid samples that could be collected in a single borehole entry was limited. As plural borehole entries were required to conduct an analysis reasonably representative of the formation being tested, the expended time and cost for the inspection and analysis of formation fluids were high.

In order to make formation fluid collection and analysis economically feasible and accurately correlated to the subsurface formation, therefore, a real time analysis of the fluids is required. More particularly, measurements must be conducted with electronics that is maintained at atmospheric pressure while in a tester which is in a borehole, and which is being subjected to subsurface tempertures and pressures. Further, since the subsurface formation tester must operate in a borehole at a depth that is often many miles beneath the surface, the size and weight of the formation tester must be minimized.

One type of fluid analysis that lends itself to real time formation testing involves calculating the complex permittivity of the formation fluid. The complex permittivity of a material is a function of the dielectric constant and the bulk conductivity of the material. From a measurement of the transmission and reflection coefficients of an electromagnetic RF signal which has propagated through a waveguide in which the formation fluid is flowing, the complex permittivity of the fluid can be calculated. By monitoring the complex permittivity, small differences may be detected in fluids ranging from highly resistive to highly conductive. Further, the state of the fluid (pure fluid or mixture of fluids) can be identified and the components of the mixture can be quantified.

There have been numerous techniques and devices that have been developed to measure the complex permittivity of subsurface formation fluids. Each has operated on the principle that the propagation of electromagnetic energy through a fluid is determined by the complex permittivity of the fluid. These prior methods of measurement may be grouped into three basic categories: non-waveguide, non-TEM waveguide, and TEM waveguide.

The non-waveguide method may be further classified as a capacitance, a conductance, or a transmission method. In the capacitance method, a voltage gradient created between conducting plates is varied with time, and charges bound in material located between the plates respond to the time varying voltage gradient. The effect of these bound charges upon a voltage gradient, or electric field, is defined as the electric permittivity of the material. The electric permittivity in turn can be expressed relative to the permittivity of free space. This relative permittivity is also referred to as the dielectric constant of the material.

Non-waveguide methods for measuring the complex permittivity of a fluid being sampled by a subsurface formation tester are generally unacceptable. Capacitance sensors have insufficient response in conductive fluids such as continuous water phase fluids. Conductivity sensors have insufficient response in non-conductive fluids such as gas or continuous phase oil mixtures. Further, non-waveguide transmission measurements cannot be implemented inside of a metal tool. To be implemented in a subsurface formation testing tool, a non-waveguide transmission measurement would require construction of a completely non-metallic section of the tool. Therefore, a non-waveguide transmission measurement is highly impractical for use in a subsurface formation tester. Typical of this type of sensor are those disclosed in U.S. Pat. Nos. 4,458,524; 4,319,191; 4,700,141; 4,594,551; 4,636,731; 4,622,518; 4,609,873; 3,982,176; 4,209,747; and 4,107,598.

In a conventional conductance method, a voltage gradient, or electric field, again is established between two conductors. Any free charges in material occupying the space between the conductors will move under the influence of the electric field. The movement of free charges, or current flow, is proportional to the amplitude of the electric field, and the constant of proportionality is defined to be the conductivity of the material.

The shortcoming of conventional conductance and capacitance methods is that the measurement of one of the physical parameters (conductance or capacitance) will often times foil the measurement of the other. For example, a capacitance measurement will be corrupted if there is a conductive path between its electrodes. Similarly, a conductance measurement will be corrupted by a non-conductive oil film on its electrodes.

One solution is to separate the non-conductive fluids from the conductive fluids before performing the measurements as disclosed in U.S. Pat. No. 4,962,665. Unfortunately, this solution mandates the collection of a volume of the fluid to be tested, and the separation of the fluid types, before testing can occur. The operator of a subsurface formation tester wants to see the fluid type change from mud filtrate to formation fluid as the fluid is extracted from the formation. The fluid separation technique disclosed in the above '665 patent is not conducive to such real time testing. Alternatively, the conductivity and dielectric constant of a material can be combined into a single parameter, the complex permittivity. The complex permittivity in turn may be derived from a single parameter, either the characteristic impedance or the complex wave number of the material being tested.

More particularly, the propagation of electromagnetic radiation through a material may be described by the wave equation for a plane wave. The reflection and refraction of electromagnetic radiation at the interface between two different materials are described by Fresnel's equations. The propagation of electromagnetic radiation through various materials can be expressed in terms of an attenuation and phase delay, which in turn can be predicted by judiciously combining the wave equation with Fresnel's equations. As a plane wave propagates through matter, it experiences an attenuation and phase delay per unit length as a function of the complex permittivity of the matter. This function of the complex permittivity is defined to be the complex wave number, k, of the propagating radiation. A plane wave's propagation is completely described by the product of the wave number and the distance of propagation.

Another function of the complex permittivity of a material is the characteristic impedance, Z, of the material. The reflection of electromagnetic radiation from the interface between two materials is completely described by the difference between the characteristic impedances of the materials.

Conductors in proximity to the plane wave alter its propagation. If a conductor is used to guide electromagnetic radiation through space, the conductor is defined to be a waveguide. If permitted, electromagnetic radiation will propagate along the surface of a conductor with little attenuation. If the radiation is forced to propagate through the conductor, however, it will be severely attenuated either by reflection from the surface of the conductor or by absorption in the conductor. If multiple parallel conductors are present, the electromagnetic radiation will propagate in the space between the conductors. Further, electromagnetic radiation can propagate only in a direction orthogonal to either its electric or magnetic field components. Depending upon which field component is in the transverse plane, the mode of propagation is defined to be transverse electric, TE, or transverse magnetic, TM. In the special case where both field components are in the transverse plane, the mode of propagation is defined to be transverse electromagnetic or TEM.

In free space, only TEM mode propagation is possible. By way of contrast, if a single conductor is used as a waveguide, TEM mode propagation is impossible. The waveguide conductor establishes a boundary condition for the field component in the transverse plane. If this conductor is the inside wall of a cavity, then the wavelength of the radiation which can propagate through the cavity without attenuation in the walls is limited by the longest transverse dimension of the cavity. The frequency of the signal which has a wavelength equal to twice the longest transverse dimension of the cavity in this propagation mode is defined to be the cutoff frequency. Stated another way, the signal's frequency must be above the cutoff frequency of the waveguide cavity to have a wavelength less than twice the longest transverse dimension of the cavity. This restriction sets a lower limit on either the operating frequency or the dimensions of the cavity. To overcome these limits, a second conductor can be added to the interior of the cavity and in parallel with the interior walls of the cavity.

The addition of a second conductor to the interior of a waveguide cavity permits the propagation of TEM mode waves in the cavity. A TEM mode wave has no cutoff frequency. The simplest geometry for a TEM mode waveguide is a cylindrical cavity with a cylindrical center conductor forming a coaxial waveguide. Wave propagation in such a waveguide is described completely by the product of the complex wavenumber and the propagation distance, similar to a plane wave in free space.

Known techniques using other than TEM mode waveguides for measuring the complex permittivity of a fluid are generally unacceptable for use in a subsurface formation tester. The dimensions of a subsurface formation tester are limited by its operating requirements. The diameter of the tester has to be minimized to fit in a wide variety of boreholes. Tool diameters in excess of 8 inches are unacceptable, and diameters less than 6 inches are preferable. The length of subsurface tools which must be operated on a wireline is generally limited by the consideration that additional length equals additional mass. Because these tools must be pulled through holes of varying rugosity and inclination with a cable that is often several miles long, the mass and length of the tool are minimized wherever possible. The minimum dimensions of non-TEM waveguides are limited by cutoff frequency considerations. Also, because of the wide variety of fluids which can be sampled by a subsurface formation tester, a non-TEM mode waveguide will propagate higher modes as the complex permittivity of the fluid increases. In other words, as the complex permittivity of a fluid increases, the wavelength of a signal propagating through the fluid decreases. Higher modes of propagation in the waveguide represent integral multiples of half wavelengths that will fit within the transverse dimensions of the waveguide. Therefore, the spatial dependence of a signal in a non-TEM mode waveguide will be a function of the complex permittivity of the fluid and the mode of propagation.

Non-TEM mode waveguides used to measure the complex permittivity of materials can be grouped into three basic categories: external waveguides, internal waveguides and waveguides with sample holders.

External waveguides are typically comprised of a conductor or conducting surface along which a TM mode wave is propagated. The material adjacent to the conductor determines the complex wave number of the signal propagating along the conductor. Such waveguides have been used successfully to measure the complex permittivity of subsurface formations by placing the waveguide adjacent to the formation. There are no cutoff frequency limitations for a waveguide of this design. The only limitation is that the conductive surface forming the waveguide cannot completely surround the material being examined. Therefore, it is impossible to incorporate an external waveguide into the interior of a metal subsurface formation tester. Typical examples of TM mode external waveguides are those disclosed in U.S. Pat. Nos. 3,944,910; 4,511,842; 4,300,098; 4,158,165; 4,156,177; 4,151,457; 4,092,583; 4,077,003; 4,063,151; 4,052,662; 4,185,238; and 4,652,828.

If the conducting surface of the waveguide surrounds the material being examined, then the waveguide can be classified as an internal waveguide, also known as a cavity. A fundamental limitation for internal waveguides is the requirement that the dimension of the transverse plane in the cavity must be at least one half of the wavelength of the radiation being propagated in the waveguide. Therefore, there will be a minimum signal frequency which can be propagated through the waveguide without being attenuated in the walls of the waveguide. This minimum frequency is defined to be the cutoff frequency for a particular mode of propagation in the waveguide. If the frequency of operation is increased, the wavelength of the radiation will decrease until it is small enough that some multiple of a half wavelength will fit into a transverse dimension of the waveguide. The frequency at which this occurs is defined to be the cutoff frequency for a higher mode of propagation. For example, an air filled cylindrical waveguide that is two inches in diameter will have a cutoff frequency of 3 GHz for its lowest mode of propagation. As the fluid in the waveguide changes from air or oil to fresh water, the signal in the waveguide changes its mode of propagation at least eight times. The specific mode of propagation, therefore, must be known before a signal measurement can be accurately interpreted. A priori knowledge of the material in the waveguide thus is required.

As the conductivity of the material increases, the attenuation per unit length increases rapidly because of the higher frequency of operation. For example, if the material in the waveguide is water saturated with NaCl at 25° C., and has a conductivity of 250 mS/cm and a dielectric constant of 45, a 3 GHz signal will be attenuated more than 100 dB per inch of propagation. It is not uncommon for water at subsurface pressures and temperatures to have conductivity in excess of 250 mS/cm. The only way to decrease the attenuation per unit length in conductive water is to reduce the frequency of the signal, which would necessitate increasing the transverse dimensions of a non-TEM waveguide.

In addition to the attenuation per unit length of propagation, the inefficiency of the antennas or apertures that are used to transmit and detect a signal in a non-TEM waveguide must be considered. Typically, the power output of the signal source must be increased to compensate for the signal loss in the waveguide. In general, a subsurface formation tester is limited in the power it can supply for a signal measurement. There is significant power loss in the miles of wireline connecting the tool to its power source, and in the hydraulic pump which is required to control the processes which extract the fluid from a subsurface formation. If a complex permittivity measurement is to be included with other in situ measurements in a subsurface formation tester, power efficiency is essential. The power and size requirements of non-TEM internal waveguides make them unacceptable for in situ measurements of the complex permittivity of fluids that are sampled by a subsurface formation tester. Typical of this type of internal waveguide are those disclosed in U.S. Pat. Nos. 5,103,181; 4,423,623; 5,101,163; and 5,453,693.

The shortcomings of the internal waveguides have to an extent been addressed in the design of so-called "sample holders" for non-TEM waveguides. Instead of filling the waveguide with a fluid, a fluid sample is confined within a sample holder which is interfaced with a waveguide transmission line. The dimensions of the waveguide transmission line can be reduced by filling it with a non-conductive, high dielectric constant material. The dimensions of the sample holder also can be small. Further, the operating frequency of such a measuring device can be reduced because of the dielectric loaded transmission line. Therefore, the attenuation per unit length of the signal propagating through the sample can be reduced. A limitation with this type of measuring device is the interface between the waveguide transmission line and the sample holder. The sample holder must have non-conductive apertures which will permit the propagation of the electromagnetic radiation through the sample. The apertures are themselves internal waveguides, and as such are subject to size limitations. The dimensions of the aperture will determine the cutoff frequency of the measurements. The limitations of the aperture can be avoided, however, by making the entire sample holder non-conductive. Unfortunately, such a solution is not viable in a subsurface formation tester constructed of metal, where the non-conductive sample holder will ultimately be bounded by a metal surface and no longer be a non-conductive sample holder.

Another feature of a waveguide with a sample holder is that a TEM mode of propagation through the sample can be approximated by using horns to interface the signal carrying waveguide with the sample holder. The limitation of this technique is the size of the horns required. The high attenuation of the signal per unit length in a conductive sample is caused by the high operating frequencies used in these techniques. Sample holders merely reduce the path length of the signal in the conductive medium. Therefore, a sample holder reduces the attenuation of the signal by a conductive medium by limiting the response of the sensor. For example, if the sample under investigation is water having a conductivity of 100 mS/cm, then the attenuation per unit length increases almost exponentially with increasing operating frequency up to 10 GHz. At higher frequencies, the attenuation is essentially constant with frequency, but greater than 70 dB/inch.

While a sample holder can reduce the attenuation of a signal by reducing the path length of the signal in the sample, such an approach will also reduce the signal's response to non-conductive samples. In subsurface formation testers, where the fluid being characterized can easily range from non-conductive hydrocarbons to water having a conductivity of 1000 mS/cm, an internal waveguide with a sample holder will have insufficient range. Typical of this type of sensor are those disclosed by U.S. Pat. Nos. 5,331, 284; 4,507,602; and 4,651,085.

A practical way to reduce the operating frequency of a waveguide cavity is to introduce a second conductor into the cavity. With two conductors, it is possible to propagate electromagnetic radiation through the waveguide in a TEM mode. There is no cutoff frequency for a TEM propagation mode. Therefore, it is a simple matter for a TEM mode waveguide to meet the size requirements of a subsurface formation tester. The lower operating frequency afforded by a TEM mode waveguide will have a smaller attenuation factor in conductive fluids. Unfortunately, the sensitivity of an electromagnetic signal to changes in the complex permittivity of a medium is directly proportional to the frequency of the signal. Increasing the propagation length of the waveguide will increase the phase sensitivity linearly, but it will also increase the attenuation of the signal exponentially.

When a differential detection method is used with a TEM mode waveguide, its sensitivity will be completely determined by the frequency of the signal being detected. If the frequency of operation or propagation length of the waveguide is increased, the attenuation factor will be increased, and subsequently the power requirements for the measurement will be increased. A differential measurement method also has the additional limitation that reflections from a detection port will interfere with signals at other detection ports. This interference will compromise the accuracy of low permittivity fluid measurements. Therefore, a TEM mode waveguide with a differential measurement scheme, such as the sensor disclosed in U.S. Pat. No. 5,341,100, will have limited sensitivity in low permittivity fluids and high power consumption in high conductivity fluids.

An alternative measurement technique for use with a TEM mode waveguide is disclosed in U.S. Pat. No. 4,996, 490. This technique measures the magnitude of the leakage admittance of a coaxial waveguide and correlates this value with the complex permittivity (expressed as a water fraction) of the fluid in the waveguide. Unfortunately, the leakage admittance is not a single valued function of the complex permittivity, because two different fluids may yield the same output. To compensate, the magnitude of the signal transmitted through the waveguide is detected as another non-single valued function of complex permittivity. Together, the two magnitude measurements uniquely define the complex permittivity of the fluid. A disadvantage of this technique is that an ohmic contact between the fluid and the two conductors will cause the leakage admittance of the waveguide to be dominated by the conductivity of the fluid in the waveguide. To this end, the device disclosed in the patent requires that the center conductor of the waveguide be anchored in a non-conductive sheath. In a highly conductive fluid, any discontinuity in this sheath will result in complete failure of the measurement. Another disadvantage is that the leakage admittance of the waveguide can be obscured by a large capacitance between the electrical feedthroughs and the waveguide. If the electrical feedthroughs are required to withstand a large pressure differential, it is preferable to reduce the cross-sectional area of the insulator between the feedthrough conductor and the waveguide body. In a subsurface formation tester, the electrical feedthroughs into the sensor are required to withstand a 20,000 psi pressure differential. Unfortunately, decreasing the cross-sectional area of the electrical feedthrough insulation has the effect of increasing the capacitance of these feedthroughs. For the above reasons, this type of sensor is undesirable for use in a subsurface formation tester.

A substantially different method for measuring the complex permittivity of a fluid using a TEM mode waveguides is disclosed in U.S. Pat. No. 5,132,903. In this method, the waveguide is filled with a non-conductive material, and the outer conductors of two parallel waveguides are bridged by the fluid in question. A signal is transmitted through one waveguide, and coupled into the second waveguide by the fluid. The magnitude of the coupled signal is a function of the signal's frequency, the complex permittivity of the fluid, the proximity of the waveguides, and the dimensions of the slots in the outer conductors of the waveguides which come into contact with the fluid. Unfortunately, increasing the signal frequency to increase the detected signal level will necessitate decreasing the slot dimensions, which in turn will decrease the detected signal level. Therefore, this technique is necessarily constrained to low signal levels. More robust detection schemes are preferable for electronics which must operate at elevated temperatures, such as in a subsurface formation tester.

SUMMARY OF THE INVENTION

The present invention is a two-port, TEM mode, coaxial waveguide flowline sensor which overcomes the size, strength, power, and sensitivity problems of prior known sensors. The waveguide is designed with impedance mismatches in the electrical feedthroughs which when used with an absolute measurement method, substantially improve the sensitivity of the waveguide to changes in the complex permittivity of a fluid. The lower operating frequency available to a TEM mode waveguide, and the robustness of direct detection of a lower frequency signal after a smaller propagation distance between only two ports, provide an enhanced sensitivity which overcomes the disadvantages of known sensors used in subsurface formation testers. Real time testing of formation fluids thereby is accommodated while a formation tester is in the borehole.

More particularly, the coaxial waveguide flowline sensor of the present invention includes an oblong, and cylindrical flowline cavity in which is placed a longitudinally aligned, oblong, and cylindrical central conductor. The central conductor is suspended within the cavity by two electrical feedthrough conductors, and is displaced from the walls of the cavity to allow the flow of fluid along a longitudinal flowline about the central conductor, and hence through the cavity. The conductive walls of the flowline cavity and the central conductor form a coaxial flowline waveguide. In addition, the two electrical feedthrough conductors, and the tunnel walls through which the conductors extend into the waveguide flowline cavity form separate and distinct coaxial waveguides that are filled with a non-conductive ceramic material that creates a high pressure seal. Impedance mismatches between the feedthrough waveguides and the flowline waveguide enhance the sensitivity of the sensor to changes in the complex permittivity of the formation fluid flowing in the flowline cavity.

A radio frequency (RF) signal is introduced to the central conductor by way of an input feedthrough conductor near one end of the central conductor. A fraction of the signal propagates through the waveguide cavity in a transverse electromagnetic (TEM) mode and is detected at an output feedthrough conductor located near the other end of the central conductor. The remaining fraction of the RF signal is reflected back through the input feedthrough conductor. The TEM field allows the RF signal to propagate through the small waveguide flowline cavity with reduced attenuation.

The transmission and reflection coefficients of the coaxial waveguide are determined from the detected signals, and are functions of the complex permittivity of the fluid occupying the flowline cavity.

In one aspect of the invention, the frequency of the RF signal is chosen in concert with the dimensions of the flowline cavity, the central conductor, the feedthrough conductors, and the ceramic insulators such that signals reflected from material interfaces in the sensor interact with the signal being propagated through the sensor. The sensitivity to changes in complex permittivity as detected from changes in phase and attenuation at the output feedthrough conductor is thereby enhanced. This enhanced response in turn improves the sensitivity of the sensor to small changes in the complex permittivity of the fluid at high temperatures and pressures.

In another aspect of the invention, the central conductor is arranged coaxially with the walls of the waveguide flowline cavity to form a TEM mode coaxial flowline waveguide which is capable of transmitting the RF signal through an electrically small flowline cavity. Further, the dimensions of the flowline waveguide are electrically small relative to the wavelength of the RF signal. A longer wavelength signal thus suffers less attenuation by highly conductive fluids, thereby extending the operating range of the sensor.

In a further aspect of the invention, the coaxial waveguide flowline sensor accommodates monochromatic RF signals, modulated signals, signals with high harmonic content, and swept frequencies. The frequency response of the waveguide flowline sensor over a broad bandwidth provides an enhanced estimate of the complex permittivity of the fluid in the sensor.

In still another aspect of the invention, the coaxial waveguide flowline sensor is constructed as a high pressure vessel with the ceramic feedthrough insulators forming high pressure seals between the feedthrough conductors and the waveguide body.

In a still further aspect of the invention, circumferential channels are grooved into the waveguide sensor to guide formation fluids into a fluid flow inlet of the waveguide flowline cavity, and through the cavity to a fluid flow outlet, thereby eliminating alignment problems that otherwise may occur when installing the sensor in a subsurface formation testing tool.

In yet an additional aspect of the invention, the feedthrough conductors, the central conductor and the walls of the waveguide flowline cavity are made of abrasion and corrosion resistant materials such as Inconel 725 stainless steel.

BRIEF DESCRIPTION OF THE DRAWINGS

The accompanying drawings, which are incorporated in and constitute a part of the specification, illustrate a preferred embodiment of the invention, and together with the general description of the invention given above and the detailed description of the preferred embodiment given below, serve to explain the principles of the invention.

DESCRIPTION OF PREFERRED EMBODIMENTS

The features, advantages and objects of the invention will become more readily apparent from the following detailed descriptions when taken in conjunction with the above drawings. In the description which follows, like components and parts are referred to by same reference numbers.

In situ characterization of a fluid being sampled by a subsurface formation tester is made difficult by the environmental and operational requirements for the measurement. The device making the measurement must have small package dimensions and low power consumption, and should be capable of extended operation in elevated temperatures at high pressures. Further, the device should be capable of measuring the complex permittivity of a wide variety of fluids, and the method of measurement should be sensitive to small changes in the fluids being sampled.

Traditionally, the complex permittivity of a material has been measured by detecting the changes in a radio frequency signal (electromagnetic radiation in the frequency band from 100 KHz to 300 GHz) as it propagates through the material. If the material is in free space, the voltage at a first point, $V_1$, is related to the voltage at a second point in the propagation path, $V_2$, by the distance between the two points, L (in meters), and the complex wave number of the signal, k (meters$^{-1}$) as follows:

$$V_2 = V_1 e^{-ikL}, \text{ where} \quad (1)$$

$$k = 2\pi f \sqrt{\frac{\mu_0 \epsilon_0 \epsilon_r}{2}} \sqrt{\sqrt{1 + \left(\frac{\sigma}{2\pi f \epsilon_0 \epsilon_r}\right)^2} + 1} - i\sqrt{\sqrt{1 + \left(\frac{\sigma}{2\pi f \epsilon_0 \epsilon_r}\right)^2} - 1}$$

For electromagnetic radiation propagating in free space or in a waveguide, two methods have been used to measure the complex wave number: a differential method and an absolute method. A differential method detects the propagating wave at two or more propagation lengths, and measures the difference in the signal as a function of the difference in the propagation lengths. An absolute method merely detects the propagating wave at one or more propagation lengths, and compares the signal to an absolute scale for a measurement. The complex wave number is a function of the frequency of the signal f(Hz), and the conductivity and dielectric constant, $\sigma$ (mhos/meter) and $\epsilon_r$, respectively, of the material in which the signal is propagating. The permeability $\mu_0$ and permittivity $\epsilon_0$ of free space are constants. Therefore, by measuring $V_1$ and $V_2$, and knowing f and L, it is possible to calculate $\sigma$ and $\epsilon_r$ for a material in free space.

If the material in which the radio frequency signal is propagating is confined to a cavity enclosed in metal, the above equations are applicable only if the dimensions of the cavity are very large relative to the wavelength of the signal. Otherwise, the signal must propagate through the cavity in either a TE or TM mode. If the dimensions of the cavity are less than one-half of the wavelength of the signal, then the signal will be severely attenuated by the metal walls of the cavity.

The addition of a second conductor in the interior of the cavity enables the signal to propagate in a TEM mode. There is no maximum wavelength limitation for TEM mode propagation in a waveguide. Therefore, a TEM mode waveguide can be constructed sufficiently small for use in a subsurface formation tester. This mode of propagation has the added advantage of being accurately represented by the plane wave equation.

Given a radio frequency signal propagating in a TEM mode, it is apparent from the plane wave equation that the sensitivity of the method of measurement to changes in the dielectric constant or conductivity of the medium in which the signal is propagating will be directly proportional to the frequency of the signal or the distance of propagation. Therefore, by making a differential measurement of the signal, it is necessary to increase the operating frequency, f, or signal path length, L, in order to increase the sensitivity of the measurement. Unfortunately, the imaginary component of the complex wave number is equivalent to an attenuation of the signal per unit length (nepers/meter). Therefore, as the propagation length or operating frequency increase, there will be less signal to detect. For example, a 100 MHz signal propagating through a NaCl solution having a conductivity of 10 mhos/meter will be attenuated at a rate of 14 dB/inch. If the frequency of the signal is increased to 3 GHz, the rate of attenuation will be 49 dB/inch. The attenuation does not, however, increase appreciably for higher frequencies up to 300 GHz. If the conductivity is merely doubled to 20 mhos/meter, the rate of attenuation at 100 MHz will increase only 6 dB to 20 dB/inch. At 3 GHz the rate of attenuation will increase more than 39 dB to 88 dB/inch. The attenuation will continue to increase with frequency up to 117 dB/inch at 30 Ghz. Meanwhile, the phase response per unit length will only increase linearly with increasing frequency. Therefore, it is not possible to increase measurement sensitivity by simultaneously increasing the operating frequency and decreasing the propagation length in conductive fluids.

In subsurface formation testers it is not uncommon to encounter waters having conductivities in excess of 25 mhos/meter. The general requirement for a sensor response is that it should be measurable in fluid conductivities ranging from 0 to 100 mhos/meter. At the same time, the general requirement for sensor sensitivity is that there should be a detectable difference in the response for a non-conductive fluid having a dielectric constant of 2.0 and a non-conductive fluid having a dielectric constant of 2.4. Most high frequency sensors meet the second requirement by neglecting the first. It is possible, however, to construct a low frequency sensor which will meet both of these requirements. The key to the success of the low frequency sensor are the laws of reflection for a electromagnetic wave. Every time an electromagnetic wave propagates through a boundary between two different media, a fraction of the wave's energy will be transmitted through the boundary while the remaining fraction will be reflected. If there are multiple boundaries that an electromagnetic wave must pass through in a particular propagation path, it is possible that there will be multiple reflections between any pair of boundaries. The interference resulting from these multiple reflections can be constructive or destructive. It is possible to use the laws of reflection in a TEM mode waveguide to enhance the response of a signal to changes in a particular medium.

The amplitude and phase of electromagnetic waves transmitted through and reflected from a boundary between two media are determined by the difference in the characteristic impedances of the media. If the media are confined to waveguides, then the characteristic impedances of the media filling the waveguides define the reflected and transmitted waves. If the waveguide is a pair of coaxial conductors where ID is the inner diameter of the outer conductor and OD is the outer diameter of the inner conductor, then the characteristic impedance of media N can be written as:

$$Z_N = \frac{1}{2\Pi} \sqrt{\frac{\mu_0}{\epsilon_0 \epsilon_{r_N}}} \left( \frac{\ln\left(\frac{ID}{OD}\right) e^{i \arctan\left(\frac{-Im(k)}{Re(k)}\right)}}{\left(1 + \left(\frac{\sigma_N}{2\Pi f \epsilon_0 \epsilon_{r_N}}\right)^2\right)^{1/4}} \right) \quad (2)$$

where $\epsilon_r$ and $\sigma_N$ respectively are the dielectric constant and conductivity of medium N. The fraction of a wave which will be reflected at a boundary between medium 1 and medium 2 will then be:

$$\text{Reflected Fraction} = \frac{(Z_2 - Z_1) V_{in}}{Z_1 + Z_2}$$

The fraction of a wave which will be transmitted from medium 1 to medium 2 will be:

$$\text{Transmitted Fraction} = \frac{2 Z_2 * V_{in}}{Z_1 + Z_2}$$

If a fluid filled, TEM mode, coaxial waveguide is sandwiched between two impedance mismatches, it is possible to establish multiple reflection within the fluid filled cavity that will enhance the response of the sensor to small changes in the fluid's complex permittivity. For example, if medium 2 is bounded by medium 1 on both ends, the length, characteristic impedance, and wave number associated with the Nth medium are $L_N$, $Z_N$ and $k_N$ respectively. The change in the voltage of a signal propagating through these three media, and resulting four interfaces, can be written as:

$$V_{out} = \frac{V_{in}}{S_{22}}$$

$S_{22}$ is a complex number such that:

$$Re(S_{22}) = \frac{(Z_1 + Z_2)^2 \cos(2k_1 L_1 + k_2 L_2) - (Z_1 - Z_2)^2 \cos(2k_1 L_1 - k_2 L_2)}{4 Z_1 Z_2}$$

and:

$$Im(S_{22}) = \frac{(Z_1^2 - Z_2^2) \sin(k_2 L_2)}{Z_1 Z_2}$$

The reciprocal of $S_{22}$ is the transmission coefficient for the sensor. Typically, the dimensions and dielectric constant of the feedthrough insulator are limited by mechanical considerations. The characteristic impedance of the feedthrough waveguides, $Z_2$ in the equation above, then becomes a constant. The maximum rate of change of the transmission coefficient with a change in the characteristic impedance of the flowline waveguide, $Z_1$, will occur at some difference between $Z_1$ and $Z_2$. The complex permittivity at which the sensitivity will be maximized can be selected, thus determining the dimensions of the waveguide and center conductor in accordance with the equation for $Z_N$. Thus, the rate of change of the reciprocal of $S_{22}$ is maximized with a change in the characteristic impedance of the flowline waveguide resulting from a change in the complex permittivity of a fluid at the RF operating frequency. If there are no mechanical constraints for the feedthrough waveguides, the transmission coefficient's rate of change with a change in the difference between $Z_1$ and $Z_2$ can be maximized. The dimensions and insulating material for the feedthrough waveguides can then be determined with a desired value for the flowline impedance, or vice versa. The in situ, real time measurement of the complex permittivity of a fluid in a flowline using a TEM mode waveguide requires three basic components: a radio frequency transmitter, a TEM mode waveguide through which the fluid can flow, and a receiver/detector. The scope of this invention is directed to the design and construction of a TEM mode, coaxial waveguide flowline sensor which is intended for, but not limited to, use in a subsurface formation testing tool.

Figure 1:
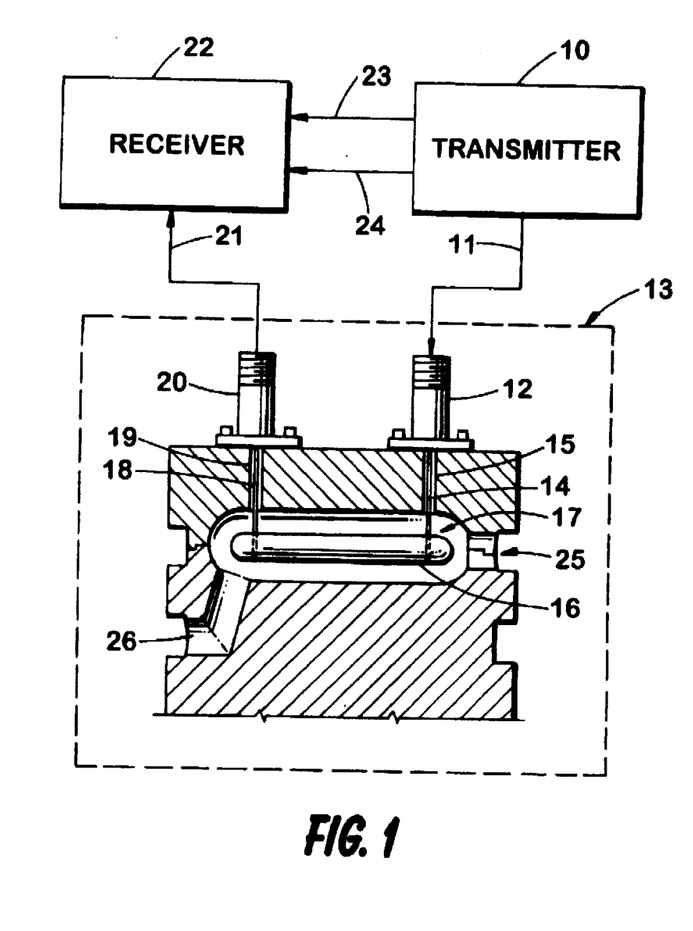
FIG. 1 is a functional block diagram of a coaxial waveguide flowline sensor in accordance with the present invention.

Referring to FIG. 1, a radio frequency transmitter 10 generates a sensor signal on a coaxial cable 11, which is connected to a flange mounted connector 12 that provides a standard 50 ohm RF connector to a coaxial waveguide flowline sensor 13. The connector 12 is mounted on a small, rigid, feedthrough conductor 14 which is seated coaxially within a ceramic electrical insulator filling a feedthrough tunnel 15 of the waveguide sensor 13. The ceramic electrical insulator forms a high pressure seal between the feedthrough conductor and the body of the sensor. The high pressure seal must withstand differential pressures as high as 20,000 psi, which can occur between the atmospheric pressure in the testing tool's electronics housing, and the pressure of the formation fluid flowing through the coaxial flowline waveguide in the borehole.

The feedthrough conductor 14 and the walls of the tunnel 15 form a coaxial feedthrough waveguide which is filled with the ceramic electrical insulator. The feedthrough waveguide provides a signal path between the connector 12, and a central conductor 16 which is suspended coaxially within a waveguide flowline cavity 17 by the feedthrough conductor 14.

A small, rigid, coaxial, electrical feedthrough conductor 18 is attached to a near opposite end of central conductor 16, and extends through a feedthrough tunnel 19 to a flange mounted connector 20. The feedthrough conductor 18 is coaxially seated within a ceramic electrical insulator that fills the tunnel 19. The conductor 18 and the walls of the tunnel 19 form a feedthrough waveguide which provides a signal path between the waveguide flowline cavity 17 and the connector 20.

The central conductor 16 and the walls of the flowline cavity 17 form a TEM mode waveguide, which hereafter is referred to as the flowline waveguide as distinguished from the feedthrough waveguides.

The output of the connector 20 is supplied by way of a coaxial cable 21 to a receiver 22. The receiver also receives a calibration signal from the transmitter 10 on line 23, and a reference signal from the transmitter on line 24.

In operation, fluid sampled by a subsurface formation tester enters the flowline cavity 17 of the sensor 13 by way of a fluid flow inlet 26, and exits the cavity by way of a fluid flow outlet 25. During the flow of formation fluid, the transmitter 10 generates an RF sensor signal on line 11 which is applied through the connector 12, through the ceramic electrical insulator about the feedthrough conductor 14, through the fluid flowing about the central conductor 16 in the flowline cavity 17, through the ceramic electrical insulator about the feedthrough conductor 18, and to the connector 20 as a transverse electromagnetic (TEM) waveform. The signal's propagation can be described by the complex value $S_{22}$ as identified above, with medium 1 being the ceramic filling the feedthrough waveguides, and medium 2 being the fluid flowing through the flowline cavity 17.

As will be explained in more detail below, the dimensions of the feedthrough conductors 14 and 18, the central conductor 16, the feedthrough tunnels 15 and 19, and the flowline cavity 17 are chosen to optimize the response of the waveguide flowline sensor 13 to a sensor signal on line 11. Further, an impedance mismatch is introduced between the feedthrough waveguides comprising the conductors 14 and 18 in tunnels 15 and 19, and the flowline waveguide comprising the central conductor 16 and the flowline cavity 17, to enhance the resolution of the signal measurements. Still further, the presence of a cylindrically shaped and oblong central conductor within the cylindrically shaped and oblong waveguide flowline cavity ensures the propagation of a TEM mode wave within the cavity. The signal attenuation, which otherwise would occur as the RF signal propagates through an electrically small waveguide cavity, is thereby substantially reduced.

The receiver 22 of FIG. 1 processes the sensor output signal on cable 21, and the transmitter signals on lines 23 and 24, to determine the complex permittivity of the formation fluid. As a consequence, the occurrence of high hydrocarbon content in the formation fluid may be identified.

Figure 2:
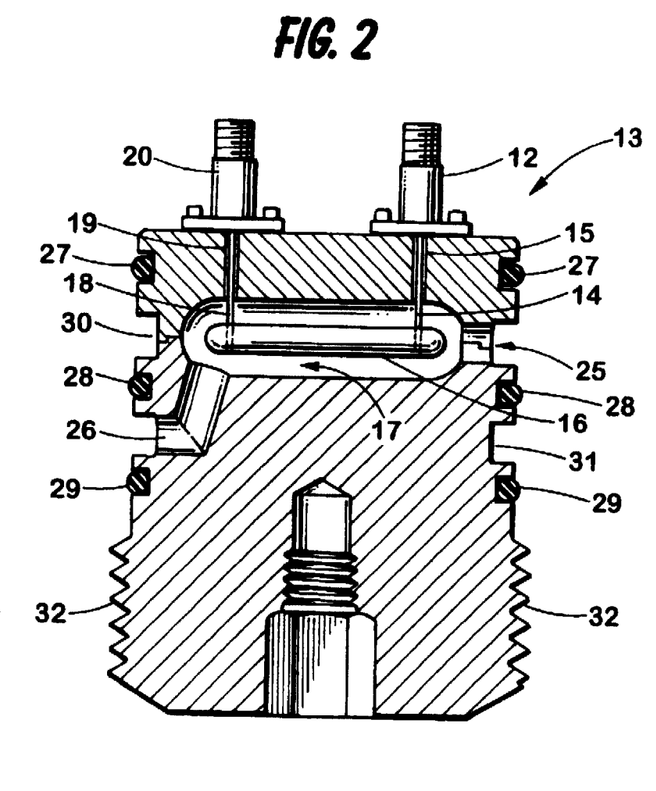
FIG. 2 is a side cross-sectional view of the coaxial waveguide flowline sensor 13 of FIG. 1.

FIG. 2 illustrates the coaxial waveguide flowline sensor 13 of FIG. 1 in more detail. The flange mounted connectors 12 and 20, as before described, respectively provide standard 50 ohm radio frequency input and output connectors to the sensor. Further, the high pressure feedthrough tunnels 19 and 15 combine with feedthrough conductors 18 and 14 to form coaxial waveguides between the flowline cavity 17 and the connectors 12 and 20. This occurs in an environment of high differential pressure between the electrical housing of the tester (transmitter 10 and receiver 22) and the flowline cavity 17.

The conductor 16 is immersed in the formation fluid flowing from the inlet 26 through the cavity 17 and exiting at the outlet 25. When an RF sensor signal is received at the connector 12, the signal propagates as a TEM wave between the feedthrough conductors 14 and 18 and walls of the feedthrough tunnels 15 and 19, as well as between the walls of the waveguide cavity 17 and the central conductor 16. The signal then is sampled at the connector 20 for processing by the receiver 22 of FIG. 1.

The sensor 13 is seated within a formation testing tool by a threading 32. The electrical housing of the testing tool is isolated from the formation liquid by O-ring seals 27, 28 and 29. The fluid flow is directed by an annular channel 31 formed in the outer circumference of the sensor 13 into the fluid flow inlet 26. A further annular channel 30 formed in the outer circumference of the sensor 13 provides a flow path for the fluid exiting the outlet 25 of the cavity 17. The channels circumvent the sensor 13 and eliminate any alignment problems which otherwise may occur in threading the sensor into the formation test tool.

The dimensions of the flowline cavity 17, the central conductor 16, and the high pressure feedthrough waveguides were chosen in accordance with the equations for the characteristic impedance of a coaxial waveguide and the complex value $S_{22}$ given above. The diameters of the cavity and conductors, as well as the electrical properties of the ceramic electrical insulators filling the tunnels 15 and 19, were chosen to increase the measurement resolution for the phase and attenuation of the signal for non-conductive fluids, but without excessively increasing the attenuation of the signal by conductive fluids to obtain optimum response at the operating frequencies.

Figure 3:
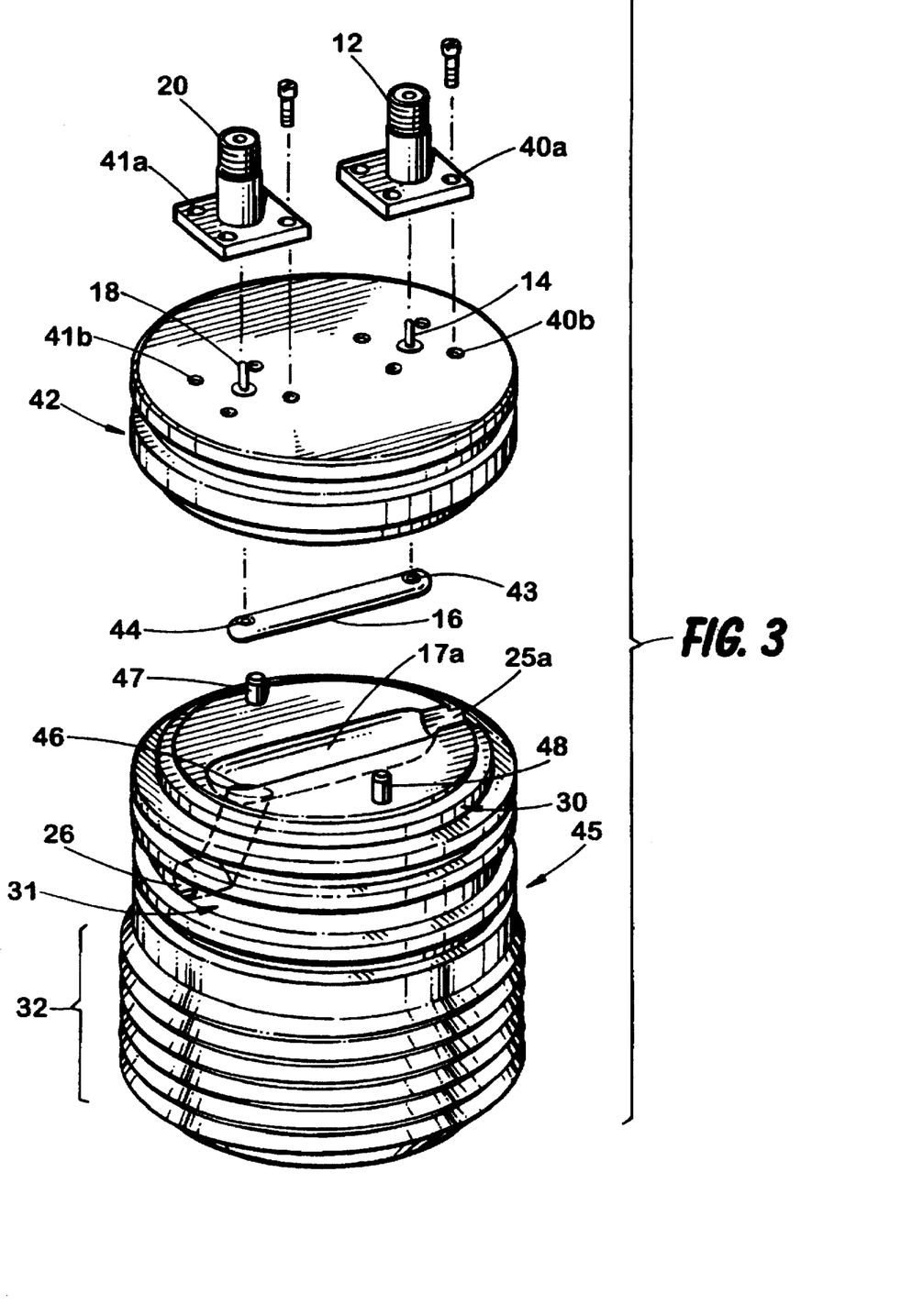
FIG. 3 is an exploded three-dimensional illustration of the invention from a side elevated view above the top surface.

FIG. 3 is an illustration of the coaxial waveguide flowline sensor 13 of the present invention with flanged connectors 12 and 20 having screw holes 40a and 41a respectively aligned with threaded holes 40b and 41b to secure the flanges to a top subassembly 42. The feedthrough conductors 14 and 18 extend through the top subassembly 42 to seat respectively in vias 43 and 44 to hold the central conductor 16 above the lower surface 17a of the flowline cavity 17 in a bottom subassembly 45. The flowline cavity includes a lower outlet surface 25a for expelling fluid, and an annular tunnel 46 leading to inlet 26 of the bottom subassembly. Two dowel pins 47 and 48 extend upward from the top surface of the bottom subassembly to align with and seat inside of receiving holes in the bottom surface of the top subassembly 42. Annular circumferential grooves 30 and 31 channel fluid flowing in the formation tester into the inlet 26 and out of the outlet 25, respectively, when the waveguide sensor is threaded into the formation tester by the threadings 32.

The combination of the dowel pins 47,48 and the annular grooves 30,31 eliminates alignment problems which otherwise could occur when threading the sensor into the formation tester.

Figure 4:
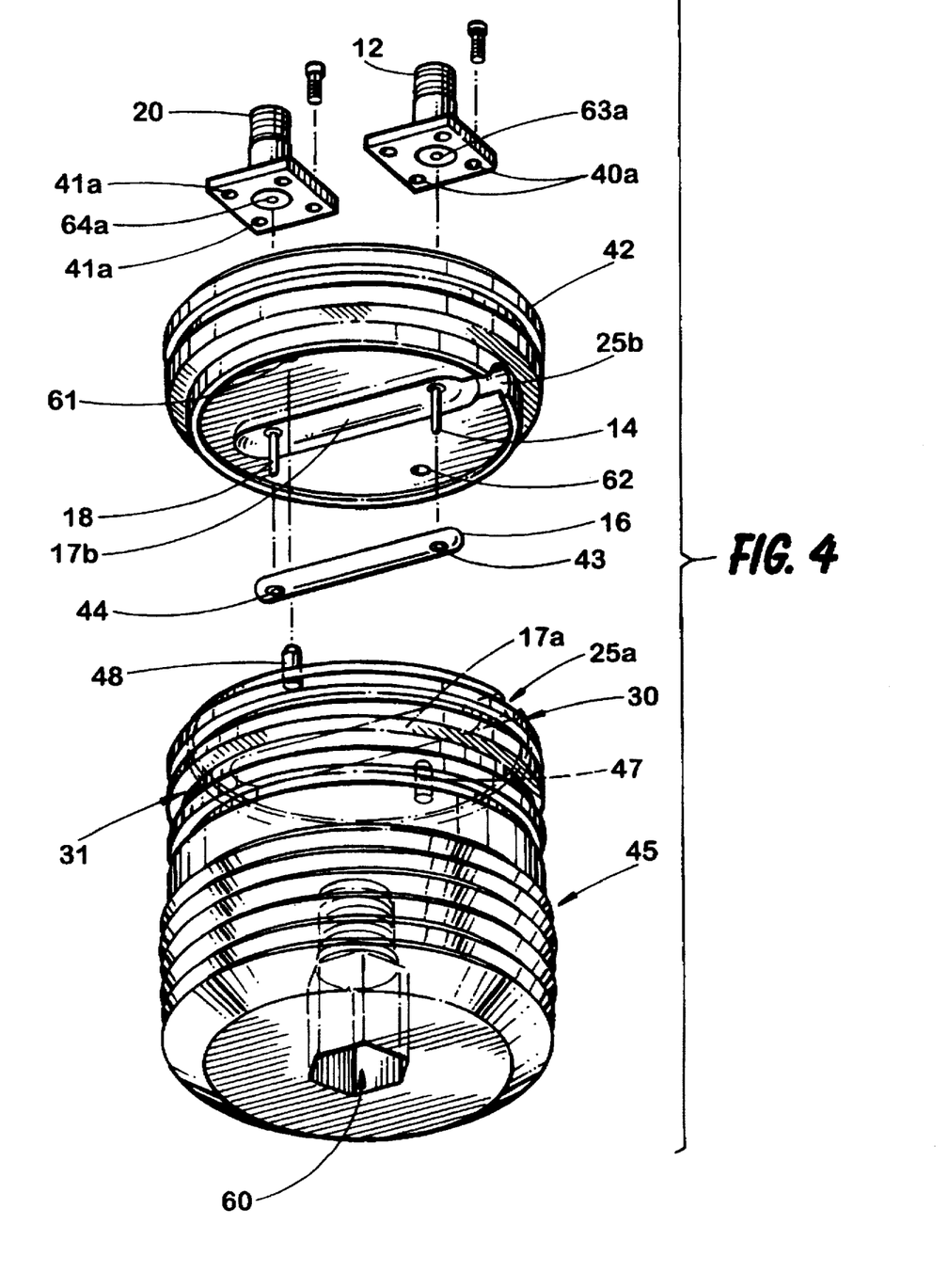
FIG. 4 is an exploded three dimensional illustration of the invention from a side view looking up from the bottom subassembly 45 of FIG. 3.

Referring to FIG. 4, a receiving hole 60 is shown in the bottom surface of the bottom subassembly 45 for receiving a threaded tool that is used when installing or removing the waveguide sensor from the formation tester. The annular groove 31 in the bottom subassembly channels fluid to the inlet 26 as before described, and the annular groove 30 channels formation fluid from the waveguide sensor outlet 25.

The dowel pin 48 seats within a dowel hole 61, and the dowel pin 47 seats within the dowel hole 62 when the bottom subassembly 45 is brought together with the top subassembly 42. The central conductor 16 is held within the flowline cavity 17 by the feedthrough conductors 14 and 18 extending from the upper surface 17b of the waveguide flowline cavity 17. The feedthrough conductors are seated into the seating vias 43 and 44 of the central conductor 16. The upper half 25b of the fluid flow outlet 25 appears at one end of the upper surface 17b of the flowline cavity 17.

The feedthrough conductors 14 and 18 extend through the top subassembly 42 and into hollow cylindrical conductors 63a and 64a, respectively, of flange mounted connectors 12 and 20. The conductors 63a and 64a are electrically isolated from the inner walls of the connectors by a ceramic dielectric. As before stated, the flanged mounted connectors are fastened to the top subassembly 42 by threaded screws extending through the flange screw holes generally indicated by reference numbers 40a and 41a, and into threaded receiving holes 40b and 41b in the top surface of the top subassembly 42.

Figure 5:
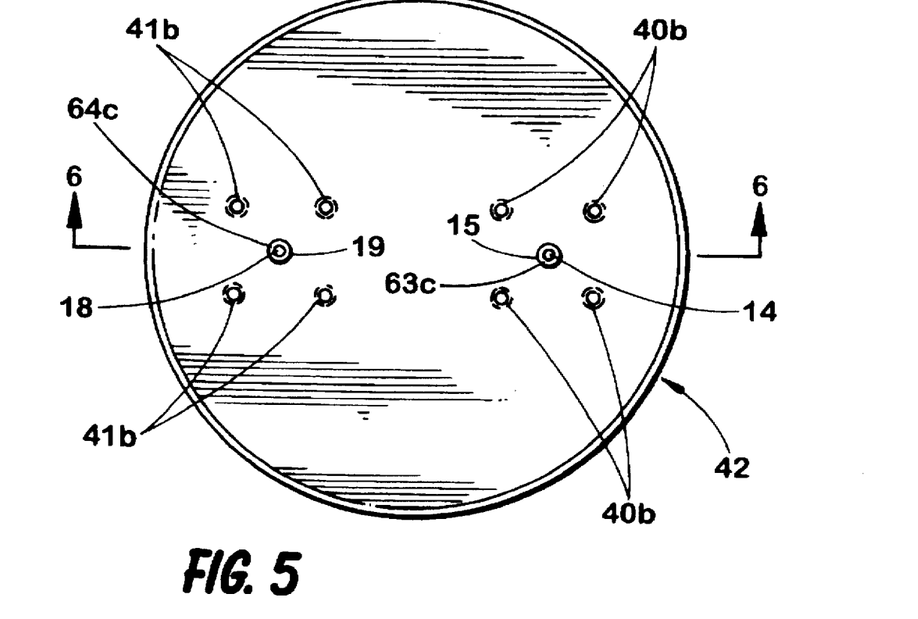
FIG. 5 is a top view of the top subassembly 42 of FIG. 3.

FIG. 5 is a top view of the top subassembly 42 showing the threaded receiving holes 40b and 41b into which threaded screws respectively fasten the flange mounted connectors 12 and 20 to the upper surface of the top subassembly. The feedthrough conductors 14 and 18 are shown extending upward out of tunnels 15 and 19, which are respectively positioned at the geometric centers of the hole patterns formed by threaded holes 40b and 41b. Feedthrough conductors 14 and 18 are centrally positioned coaxially within the tunnels 15 and 19, and seated within the ceramic insulators 63c and 64c, respectively.

Figure 6:
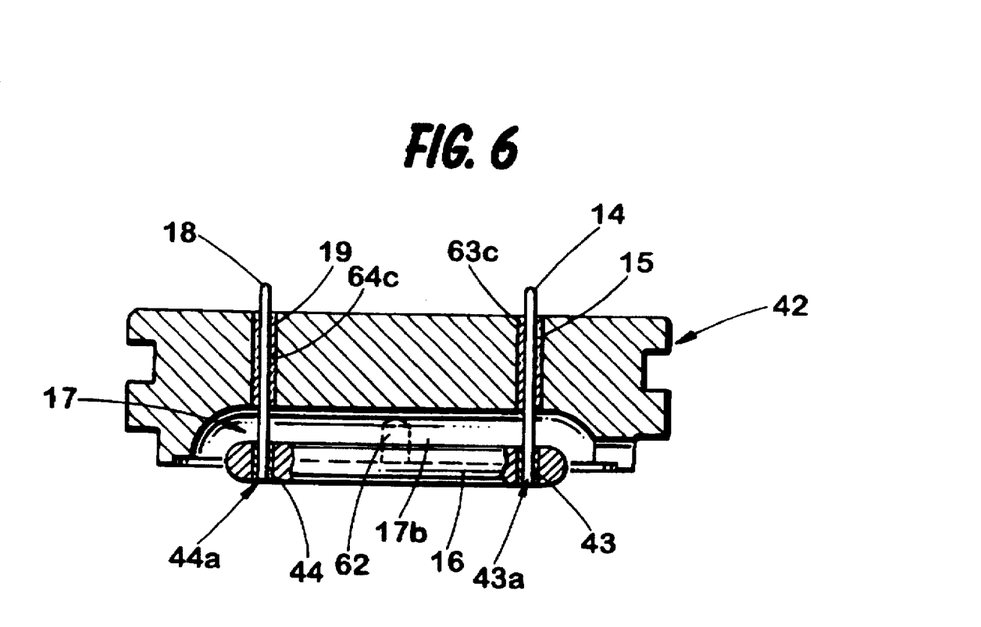
FIG. 6 is a side cross-sectional view of the top subassembly 42 of FIG. 5 along lines A—A.

FIG. 6 is a cross-sectional side view of the top subassembly 42 of FIG. 5 along lines A—A. The feedthrough conductors 14 and 18 are shown extending respectively through the tunnels 15 and 19 of the top subassembly 42, and into the seating vias 43 and 44 of the central conductor 16. The feedthrough conductors are surrounded by a ceramic electrical insulator 63c in tunnel 15, and an electrical insulator 64c in tunnel 19. The feedthrough conductors are welded to the central conductor 16 at 43a and 44a. The central conductor 16 is shown suspended by the feedthrough conductors 14 and 18 within the waveguide flowline cavity 17. A dowel pin hole 62 is shown for aligning and fitting the top subassembly 42 and bottom subassembly 45 together.

Figure 7:
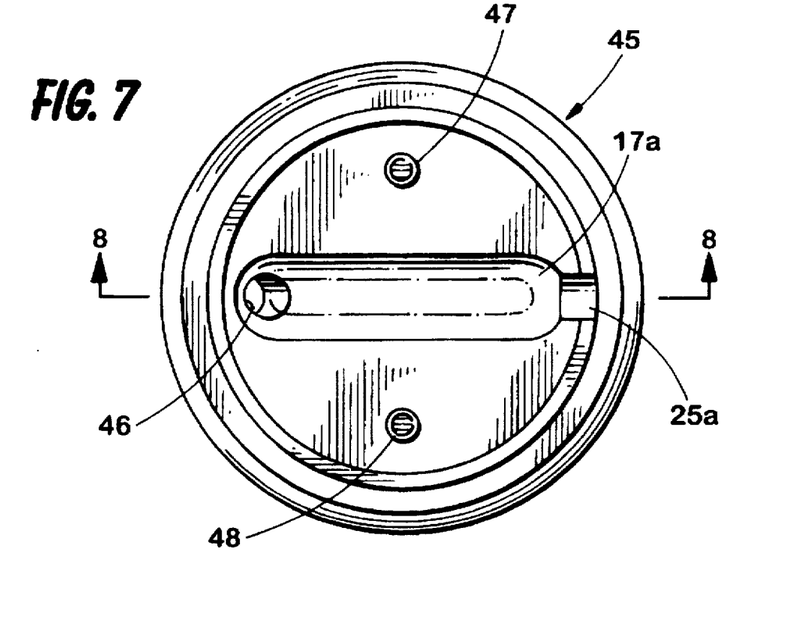
FIG. 7 is top view of the bottom subassembly 45 of FIG. 3.

A top down view of the bottom subassembly 45 is depicted in FIG. 7, where the lower surface 17a of the flowline cavity 17 is shown with the lower surface 25a of the fluid flow outlet 25 at one end, and the opening of the tunnel 46 leading to the fluid flow inlet 26 at the other end. The dowel pins 47 and 48 are shown on either side of the lower surface 17a.

Figure 8:
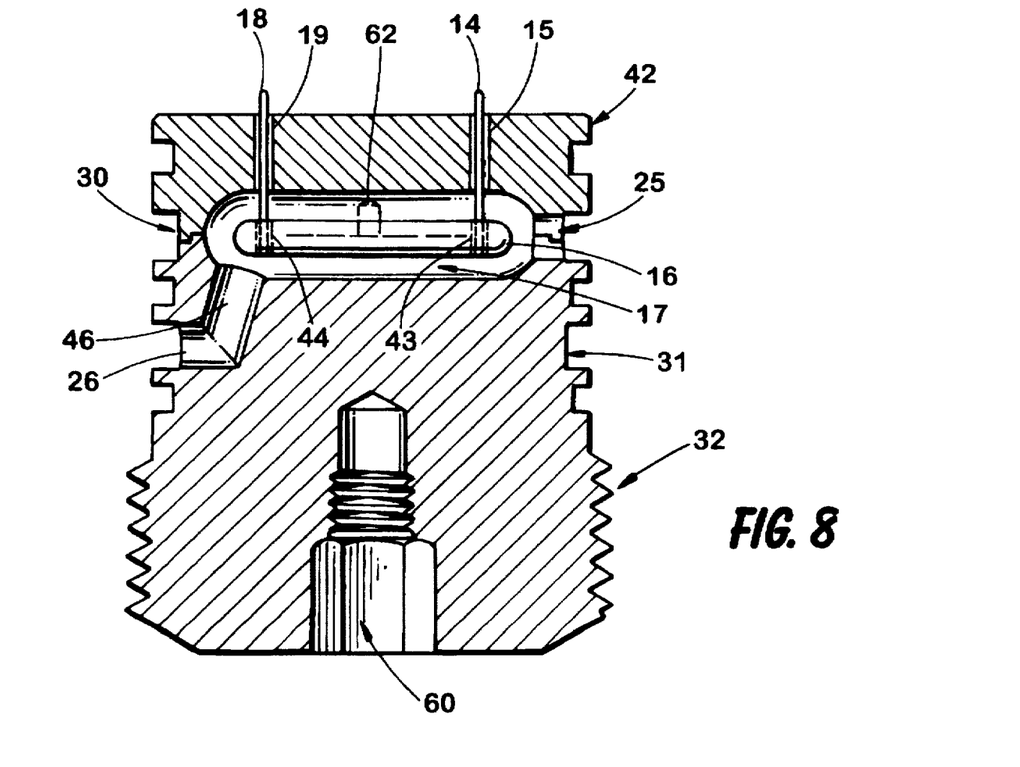
FIG. 8 is a side cross-sectional view of the coaxial waveguide flowline sensor 13 along lines B—B of FIG. 7.

FIG. 8 is a cross-sectional side view of the waveguide sensor 13 taken along lines B—B of FIG. 7. Referring to FIG. 8, the central conductor 16 is clearly shown suspended from feedthrough conductors 14 and 18 within the flowline cavity 17. The fluid flow outlet 25 is shown at one end of the waveguide flowline cavity 17, and the tunnel 46 leading to the fluid flow inlet 26 is shown at the other end of the waveguide flowline cavity. Further, the annular groove 30 leads the fluid flow from the outlet 25, while the annular groove 31 directs the fluid flow into the inlet 26. An opening for a threaded tube in the bottom of subassembly 45 is indicated by reference number 60.

In a preferred embodiment of the invention, waveguide sensor top subassembly 42 and bottom subassembly 45 are made of Inconel 725 which has been age hardened in accordance with ASTM B805 standards. The flange mounted connectors 12 and 20 may be purchased from EMC Technology Inc. of Cherry Hill, N.J., as part numbers P/N 7402. These connectors provide a standard SMA connector interface to the high pressure electrical feedthrough conductors 14 and 18. The feedthrough conductors also are made from Inconel 725 which is age hardened in accordance with ASTM B805, plated with Nickel in accordance with MIL-C-26974, and then covered with an outer plating of gold in accordance with MIL-G-45204. The conductors are seated within a ceramic insulator in the feedthrough holes 15 and 19 of the top subassembly 42, and welded within the vias 43 and 44 of the central conductor 16 so that the lower ends of the feedthrough conductors are flush with the bottom of the central conductor 16. The ceramic insulators must be able to withstand a continuous pressure differential of 20,000 psi, and may be purchased from Pacific Coast Technologies in Roseburg, Oreg. as a ceramic potting process.

To complete the assembly of the waveguide sensor, the top subassembly 42 is aligned with the alignment pins 47 and 48, and the top subassembly 42 and the bottom subassembly 45 are welded together.

All components of the coaxial waveguide sensor which come into contact with the formation fluid, including the central electrode 16, the feedthrough conductors 14 and 18, and the walls of the flowline cavity 17, are made from NACE approved $H_2S$ resistant materials.

As before stated, the dimensions of the coaxial waveguide flowline cavity and feedthroughs are selected for optimum response at the operating frequency. The sensitivity of the sensor to small changes in dielectric constant and conductivity is further enhanced by creating impedance mismatches between the feedthrough waveguides and the flowline waveguide in accordance with the equation for the complex value $S_{22}$. The sensor thereupon exhibits an enhanced sensitivity to non-conductive fluids having dielectric constants ranging from 1 to 81, without undue attenuation from fluids having conductivities as high as 100 mhos/meter. Further, the cross-sectional area of the ceramic electrical insulators 63c and 64c were minimized to help withstand pressure differentials up to 20,000 psi. The final dimensions were a compromise between the electrical and mechanical requirements for the sensor.

With a view to the above design criteria, the essential dimensions for a 100 MHz signal were selected as follows. The distance between the feedthrough tunnels 15 and 19 (center to center) of top subassembly 42 is one inch. The feedthrough tunnels themselves are 0.073 inches in diameter. The radial thickness of the walls of the cylindrical ceramic insulator within the feedthrough tunnels is 0.037 inches±0.0005 inches. The diameter of the cylindrical feedthrough conductors 14 and 18 is 0.0360±0.0005 inches. The feedthrough conductors 14 and 18 extend 0.085 inches above the top surface of the top subassembly 42, and are 0.725 inches long.

The central conductor 16 is oblong and cylindrical in shape, and is 1.275 inches long (tip to tip). The central conductor further is 0.140 inches in diameter. The centers of the vias 43 and 44 are located 0.137 inches from the ends of the central conductor, and are 1.00 inches apart along the longitudinal axis of the central conductor. Further, each of the feedthrough holes is 0.04±0.001 inches in diameter. When the feedthrough conductors 14 and 18 are welded respectively in the vias 43 and 44 of the central conductor 16, the central conductor will be suspended centrally within the flowline cavity 17 with the longitudinal axis of the central conductor being displaced 0.2 inches from the upper surface 17b of the cavity.

The flowline cavity 17 itself is oblong and cylindrical in shape with a diameter of 0.4 inches along the cylindrical part of the cavity. One end of the cavity is of a hemispheric dome shape with a radius of 0.2 inches. The end of the cavity having the fluid flow outlet 25 also has a hemispheric dome shape with a radius of 0.2 inches, and in addition has a central opening in the apex of the dome leading to an annular tunnel to the fluid flow outlet 25. Both the central opening and the annular tunnel have a diameter of 0.218±0.005 inches.

The center of the annular tunnel 46 is located 0.560 inches longitudinally from the center of the flowline cavity 17, and is angled downward 15°±2° to the left of vertical. The annular tunnel has a radius of 0.218±0.005 inches, and is long enough to join a horizontal annular tunnel leading inward of the bottom subassembly 45 from the fluid flow inlet 26. The horizontal annular tunnel also has a radius of 0.218±0.005 inches with its longitudinal axis located 0.530 inches vertically from the longitudinal axis of the flowline cavity 17.

Figure 9:
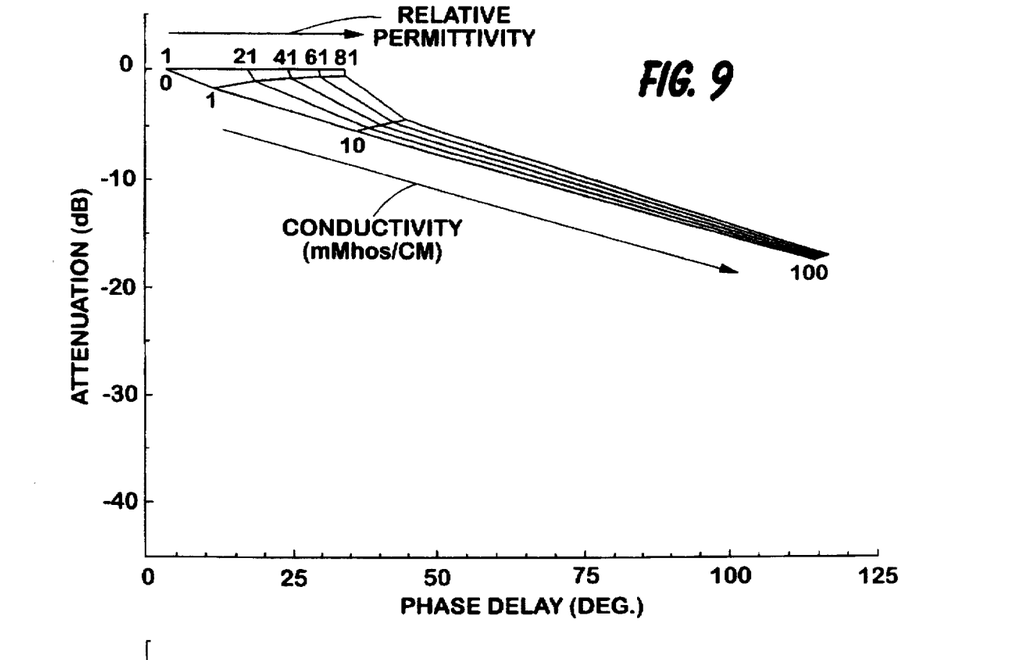
FIG. 9 is a phase/attenuation chart with a fluid conductivity/dielectric constant chart illustrating graphically the response to a 100 MHz signal received at the output of the coaxial waveguide flowline sensor 13 in accordance with the invention, but without impedance mismatches between the feedthrough waveguides and the flowline waveguide.

A reasonable compromise between signal sensitivity and attenuation can be obtained at an operating frequency of 100 MHz when used in conjunction with a sensor that employs the impedance mismatching technique previously described. The enhanced response achieved by impedance mismatching may be seen from a comparison of the responses depicted in FIGS. 9 and 10. If the propagation of a 100 MHz signal is measured, as in a differential measurement, with detectors separated by 1.25 inches, and without impedance mismatching, the response will be as shown in FIG. 9. The propagation length of 1.25 inches for the differential measurement was selected because that is the equivalent propagation length for a sensor in accordance with the invention as described above. The differences between the responses illustrated in FIGS. 9 and 10, therefore, is due primarily to impedance mismatches. The chart shows lines of constant $\epsilon_r$ (relative permittivity or dielectric constant) and lines of constant $\sigma$ (conductivity). The attenuation and phase delay of a 100 MHz signal propagating through a medium can be read off of the axis at the intersection of the dielectric constant and conductivity lines describing this medium.

Figure 10:
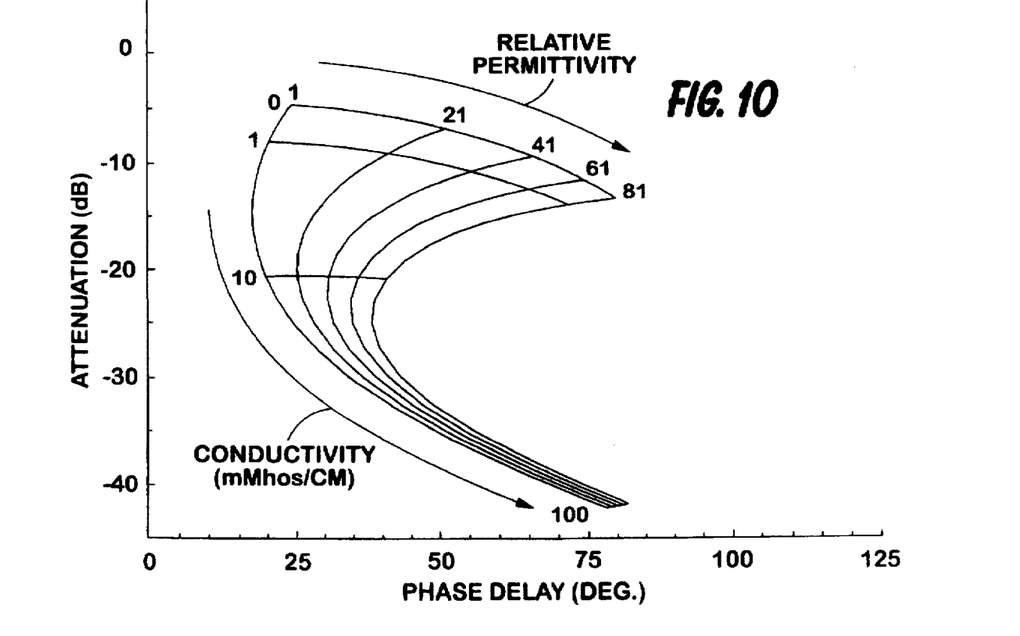
FIG. 10 is a phase/attenuation chart with a fluid conductivity/dielectric constant chart which illustrates the enhanced response to a 100 MHz signal received at the output of the coaxial waveguide flowline sensor when impedance mismatches are introduced between the feedthrough waveguides and the flowline waveguide.

If a sensor is constructed in accordance with the dimensions described above, and an impedance mismatch is introduced between the feedthrough waveguides and the coaxial flowline waveguide, the sensor response to a 100 MHz signal as determined in an absolute measurement will be as shown in FIG. 10. It is important to note that not only the phase response, but also the attenuation response to non-conductive fluids is enhanced. In the differential response shown in FIG. 9, there is no attenuation response in non-conductive fluids. It is the combination of the phase response with the attenuation response that enables the present invention to generate detectable differences in a signal resulting from small changes in the dielectric constant of non-conductive fluids. During this process, the attenuation of the signal in 100 mhos/meter fluid will be less than 80 dB with the enhanced sensor.

A two-port, TEM mode, coaxial waveguide flowline sensor for operation at high temperatures and pressures within a borehole has been described which has impedance mismatches between feedthrough waveguides forming signal input and output ports to the flowline cavity, and a coaxial flowline waveguide through which formation fluids flow, for enhanced sensitivity to small changes in complex permittivity. The lower operating frequencies available to TEM mode waveguides coupled with a short propagation distance of a signal between the input and output ports within the flowline waveguide before detection further enhances the sensitivity to small complex permittivity changes. Further, the operating frequency of the coaxial waveguide flowline sensor is chosen in concert with the dimensions of the feedthrough waveguides and the flowline waveguide to enhance the sensitivity of the sensor to small changes in signal attenuation and phase delay. The feedthrough waveguides also create a high pressure seal to withstand high differential pressures. Real time testing of formation fluids thereby is accommodated while the sensor is in a borehole formation tester in proximity to a formation being tested.

The invention has been described and shown with reference to particular embodiments, but variations within the spirit and scope of the general inventive concept will be apparent to those skilled in the art. For example, impedance mismatches can be incorporated into multiple port sensors, and the dimensions of the waveguide can be changed to accommodate a different operating frequency without departing from the general inventive concept. Accordingly, it should be clearly understood that the form of the invention as described and depicted in the specification and drawings is illustrative only, and is not intended to limit the scope of the invention. All changes which come within the meaning and range of the equivalence of the claims are therefore intended to be embraced therein.

What is claimed is:

1. A two-port, coaxial, waveguide flowline sensor for a borehole formation tester engaged in the real time testing of a formation while in a borehole, which comprises:

a top subassembly having a first cavity in a first lower surface for creating an upper surface of a waveguide flowline cavity through which a formation fluid may flow, and having two spaced apart vertical tunnels leading from a first top surface of said top subassembly to said first cavity;

a pair of conductors each seated in one of said two spaced apart vertical tunnels and extending above said first top surface and below said first lower surface within said first cavity;

a pair of electrical insulators each seated in one of said two spaced apart vertical tunnels and each surrounding one of said pair of conductors to form feedthrough waveguides which effect a high pressure seal;

a pair of coaxial connectors each connected to one of said pair of conductors and fastened to said first top surface for creating an input electrical port and an output electrical port to said first cavity;

a central conductor physically and electrically connected to said pair of conductors and spaced coaxially within inner walls of said waveguide flowline cavity to form a coaxial flowline waveguide through which a TEM mode RF signal may propagate, wherein said coaxial flowline waveguide is impedance mismatched with said feedthrough waveguides; and a bottom subassembly having a second cavity in a second top surface of said bottom subassembly for forming said waveguide flowline cavity with said first cavity when said bottom subassembly is sealingly attached to said top subassembly, said waveguide flowline cavity enclosing said central conductor coaxially about a longitudinal axis in a spaced apart relation.

2. The waveguide flowline sensor of claim 1, wherein said TEM mode RF signal is chosen in concert with physical dimensions of said waveguide flowline cavity, said pair of conductors, said pair of electrical insulators, and said central conductor, which are selected in accordance with characteristic impedances $Z_N$ of said feedthrough waveguides and said coaxial flowline waveguide to maximize the rate of change of the reciprocal of $S_{22}$ for a change in characteristic impedance of said coaxial flowline waveguide resulting from a change in complex permittivity of said formation fluid at an operating frequency of said TEM mode RF signal.

3. The waveguide flowline sensor of claim 1, wherein said bottom subassembly has a third tunnel leading from said waveguide flowline cavity to an outer surface of said bottom subassembly for channeling flow of said formation fluid into said waveguide flowline cavity, and said waveguide flowline cavity is oblong and cylindrical in shape and has an annular fluid flow outlet at one end and a tunnel opening near an opposite end leading to said third tunnel through which said formation fluid enters said waveguide flowline cavity.

4. The waveguide flowline sensor of claim 3, wherein said central conductor is oblong and cylindrical in shape, and coaxially aligned along said longitudinal axis and suspended within said waveguide flowline cavity by said pair of conductors for receiving an RF signal on one of said pair of conductors and causing said RF signal to propagate as a TEM mode wave within said waveguide flowline cavity to a second of said pair of conductors.

5. A waveguide flowline sensor for detecting small changes in a complex permittivity of a formation fluid by enhancing phase delay and attenuation of an RF signal propagating through said waveguide flowline sensor, which comprises:

conductor means including a pair of feedthrough waveguides for providing an electrical path resistive to high differential pressure from an outer surface of said waveguide flowline sensor to an inner cavity of said waveguide flowline sensor, said inner cavity having a fluid flow inlet evolving from a tunnel at one end and a fluid flow outlet at another end for channeling said formation fluid through said inner cavity; and a central conductor located within said inner cavity, in electrical communication with said conductor means, and coaxially aligned along a longitudinal axis of said inner cavity but spaced apart from inner walls of said inner cavity, for forming a coaxial flowline waveguide with said inner walls, wherein said coaxial flowline waveguide is impedance mismatched with said feedthrough waveguides in accordance with a complex value $S_{22}$ for enhanced sensitivity to changes in said complex permittivity, and said RF signal propagates through said coaxial flowline waveguide in a TEM mode.

6. The waveguide flowline sensor of claim 5, wherein an operating frequency of said RF signal is selected in concert with physical dimensions of said feedthrough waveguides, said coaxial flowline waveguide, and said central conductor, with said physical dimensions being selected in accordance with characteristic impedances $Z_N$ of said feedthrough waveguides and said coaxial flowline waveguide to maximize the rate of change of the reciprocal of $S_{22}$ for a change in characteristic impedance of said coaxial flowline waveguide resulting from a change in said complex permittivity of said formation fluid at said operating frequency.

7. The waveguide flowline sensor of claim 6 wherein said physical dimensions transverse to direction of propagation of said RF signal are less than one-half wavelength of said RF signal to restrict mode of propagation of said RF signal to said TEM mode.

8. The waveguide flowline sensor of claim 5, wherein said pair of feedthrough waveguides are spaced apart a distance which is less than one inch, and said operating frequency is less than 500 MHz.

9. The waveguide flowline sensor of claim 5, wherein an absolute measurement is used to detect small changes in said complex permittivity.

10. The waveguide flowline sensor of claim 5, wherein said waveguide flowline sensor is made of Inconel 725 stainless steel.

11. The waveguide flowline sensor of claim 5, wherein said RF signal may be monochromatic, modulated, swept over a broad bandwidth, or have high harmonic content.

* * * * *